(12) United States Patent
Tye et al.

(10) Patent No.: US 6,384,119 B1
(45) Date of Patent: May 7, 2002

(54) COATING COMPOSITIONS COMPRISING VOLATILE LINEAR SILOXANE FLUIDS

(75) Inventors: Anthony J. Tye, Waterville; Ali A. Rihan, Toledo, both of OH (US)

(73) Assignee: BASF Corporation, Southfield, MI (US)

( * ) Notice: Subject to any disclaimer, the term of this patent is extended or adjusted under 35 U.S.C. 154(b) by 0 days.

(21) Appl. No.: 09/612,023

(22) Filed: Jul. 7, 2000

Related U.S. Application Data

(60) Provisional application No. 60/213,426, filed on Jun. 22, 2000.

(51) Int. Cl.$^7$ .............................................. C08K 5/5415
(52) U.S. Cl. ....................... 524/267; 524/589; 524/560; 524/601
(58) Field of Search ................. 524/267, 589, 524/560, 601; 427/388.1, 387, 489

(56) References Cited

U.S. PATENT DOCUMENTS

| | | | |
|---|---|---|---|
| 3,843,571 A | * 10/1974 | Fitzgerald | |
| 3,862,062 A | * 1/1975 | Harper | |
| 4,419,484 A | 12/1983 | Sattlegger et al. | 524/731 |
| 4,476,278 A | 10/1984 | Shimizu | 524/588 |
| 4,606,947 A | * 8/1986 | Heinrich et al. | |
| 5,085,894 A | 2/1992 | Pascussi et al. | 427/387 |
| 5,188,716 A | 2/1993 | Schwerzel et al. | 204/181.7 |
| 5,256,191 A | 10/1993 | Thompson et al. | 106/19 A |
| 5,340,386 A | 8/1994 | Vincent et al. | 106/19 B |
| 5,741,876 A | 4/1998 | Carpenter, II et al. | 528/10 |
| 5,904,988 A | 5/1999 | Stein et al. | 428/447 |
| 6,020,410 A | 2/2000 | Hacker et al. | 524/267 |

FOREIGN PATENT DOCUMENTS

| | | | |
|---|---|---|---|
| DD | 29 8654 A5 | 8/1988 | C08J/7/04 |
| DE | 25 47 775 | 10/1975 | C09L/7/02 |
| EP | 0057874 B1 | 4/1985 | C08L/83/06 |
| EP | 9 340 421 A3 | 3/1989 | C09D/5/24 |
| EP | WO92/07914 | 5/1992 | C09D/10/00 |
| EP | WO 98/06815 | 2/1998 | C11D/7/50 |
| EP | WO9818850 | 5/1998 | C08J/3/09 |
| GB | 1 501 379 | 10/1974 | C98J/9/30 |
| JP | 48 011564 | 2/1973 | |
| JP | 58 193131 A | 11/1983 | B29H/3/00 |
| JP | 59 105057 | 6/1984 | C09D/3/82 |
| JP | 04283249 A | 8/1992 | C08J/7/04 |
| JP | 04283248 A | 10/1992 | C08J/7/04 |
| JP | 05009426 | 5/1993 | C09D/127/12 |
| JP | 6088025 | 6/1994 | C08L/83/04 |
| JP | 6-110160 | 6/1994 | C03C/3/00 |
| JP | 7-300560 | 7/1995 | C08L/83/07 |
| JP | 08092375 | 4/1996 | C08G/77/24 |
| JP | 10060374 | 3/1998 | C09D/83/04 |
| JP | 11092714 | 4/1999 | C09D/183/04 |
| SU | 1016262 A | 12/1981 | C03C/25/02 |

OTHER PUBLICATIONS

Abstract of JP 48 11564 English Statement of Relevance.
Abstract of DD 29 86 54 English Statement of Relevance.
Abstract for JP 58 193131 A English Statement of Relevance.
Abstract for JP 11092714 English Statement of Relevance.
Abstract for JP 04283248 A English Statement of Relevance.
Abstract of JP 08092375 English Statement of Relevance.
Abstract of GB 1 501 379 English Statement of Relevance.
Abstract of DT 25 47 775 English Statement of Relevance.
Abstract of JP07–300560 English Statement of Relevance.
Abstract of JP05009426 English Statement of Relevance.
Abstract of JP 06088025 English Statement of Relevance.
Abstract of JP 06110160 English Statement of Relevance.
Abstract of EP0057874 B1 English Statement of Relevance.
Abstract for JP 10060374 English Statement of Relevance.
Abstract for SU 1016262 A English Statement of Relevance.
Abstract for JP 59 105 057 English Statement of Relevance.
Information about Dow Corning O–S–10 Fluid®, 1995, pp. 10–27.
Abstract for JP 04283249A English Statement of Relevance.
Database WPI, Section Ch. Week 199702, Derwent Publications Ltd., London, GB Class A82, AN 1997–017668, JP 8283662A (Toshiba Silicone KK), Oct. 29, 1996 Abstract.
International Report for PCT/US01/11722, BASF Coporation et al., Nov. 4, 2001, on 3 pages.

* cited by examiner

*Primary Examiner*—Robert Dawson
*Assistant Examiner*—Kuo-Liang Peng
(74) *Attorney, Agent, or Firm*—Mary E. Golota

(57) ABSTRACT

The present invention provides a coating composition comprising no more than 2.00% by weight nonvolatile of Si-containing compounds, based on the total nonvolatile weight of the coating composition, and from 0.25 to no more than 5.0% by weight of a volatile linear siloxane of the formula:

$$(R)_3-Si-O-((R)_2-Si-O)_y-Si-(R)_3$$

wherein R is H or an alkyl group of from 1 to 3 carbon atoms and y is a number from 0 to 6, based on the total nonvolatile weight of the coating composition. The invention also provides a method of providing a cured coating composition having an improved distinctness of image as well as a method of coating a substrate. The compositions of the invention have improved resistance to visual defects believed to be caused by surface contamination, such as "fisheyes" or "cratering" and "telegraphing".

9 Claims, No Drawings

COATING COMPOSITIONS COMPRISING VOLATILE LINEAR SILOXANE FLUIDS

This application claims benefit of Provisional Application No. 60/213,426 Jun. 22, 2000.

FIELD OF THE INVENTION

The present invention relates to coating compositions comprising volatile, linear siloxane fluids. More particularly, the invention relates to coating compositions useful in the automotive manufacturing industry which have improved resistance to visual defects caused by surface contamination and exhibit improved gloss and/or distinctness of image (DOI).

BACKGROUND OF THE INVENTION

Coatings applied to surfaces typically serve decorative and/or protective functions. This is particularly so for automotive finishes, which must provide an esthetically appealing appearance while simultaneously meeting and maintaining rigorous performance and durability requirements. As used herein, "automotive coating or finish" encompasses both original equipment (OEM) coatings and refinish coatings, but especially to refinish coatings, the later term referring to coatings which are applied after the car has left the manufacturer, usually for repair purposes. It will be appreciated that automotive coatings are typically required to possess optimum application and performance parameters.

For example, automotive coatings must generally exhibit exceptional gloss, depth of color, and distinctness of image (DOI). An extremely high degree of clarity is necessary to achieve these desired visual effects. High gloss coatings also require a low degree of visual aberrations at the surface in order to achieve a desired visual effect such as high DOI.

One way that the automotive industry has met these challenges, especially original equipment manufacturers (OEM), involves the use of color-plus-clear composite coatings for use in the manufacture of automotive body panels. As used herein, the term "composite color-plus-clear" relates to composite coating systems requiring the application of a first coating, typically a colored basecoat, followed by the application of a second coating, generally a clearcoat, over the noncured or "wet" first coating. The applied first and second coatings are then cured. Thus, such systems are often described as "wet on wet" or "two-coat/one bake". Drying processes that fall short of complete cure may be used between the application of the coatings.

Automotive refinishers must provide appearance and performance equal to those obtained by the OEMs but must provide such performance requirements without benefit of the controlled application environments and high temperature cure ovens used in the OEM facilities. Refinish operations may involve the repair of one or more outer coating layers, the repair or replacement of entire automotive body components, or a combination of both. The terms "refinish coating" or "repair coating" may be used interchangeably.

Automotive refinishers have often met these challenges with the use of two-component coating compositions. As used herein, the term "two-component" refers to the number of solutions and/or dispersions which are mixed together to provide a curable coating composition. Up until the point of mixing, neither of the individual components alone provides a curable coating composition.

Thus, both OEMs and automotive refinishers seek to provide coating compositions with high gloss and high DOI. However, these coating compositions are often susceptible to visual defects believed to be caused by surface contamination. Examples of such defects include "fisheyes" or "craters" and "telegraphing". For the purposes of the instant application, the terms "fisheyes" and "cratering" may be used interchangeably. However, these terms as used herein refer solely to defects believed to result from surface contamination and not to defects resulting from solvent vapors and the like.

Fisheyes or craters are round concave depressions in the film that may or may not have raised edges. They vary in size from barely visible to more than 0.25 inches (6 mm) in diameter and may be deep enough to reveal the surface under the paint. While not wishing to be bound by a particular theory, it is believed that these defects result from the repulsion of the paint by contaminants on the surface of the substrate. They may occur singly in isolated events or in mass, with several hundred giving a mottled effect to the film.

Telegraphing refers to a visual defect wherein the pattern or location of a surface contaminate is visible in the cured film. For example, if an attempt is made to wipe away a contaminate, the wipe marks can 'telegraph' through the surface of the cured film, i.e., the wipe marks may be visible in the cured film.

Common contaminants believed to cause visual defects such as fisheyes and telegraphing include but are not limited to fats, oils, greases, silicones, and a variety of cosmetics and personal care products. Those skilled in the art appreciate that such visual defects are some of the most challenging paint defects to prevent or cure. They often appear suddenly and without warning, persist for a time and then disappear just as suddenly as they appeared. The presence of even one crater or fisheye may be an unacceptable defect which can result in the scrapping or repainting of an entire part or substrate.

Although products intended to eliminate such defects are known they often result in paint films having significant recoatability problems. That is, subsequently applied coating layers fail to adhere to the previously applied coating layer containing the fisheye eliminating product. Both OEM and automotive refinish compositions must be capable of adhering to subsequently applied coating compositions.

Accordingly, fisheyes and/or telegraphing present an expensive and difficult problem for the automotive finishing industry. Coating compositions of all types having improved resistance to such visual defects have long been sought.

It is thus an object of the invention to provide a coating composition having improved resistance to visual defects caused by surface contamination and which is suitable for use in both OEM and automotive refinish facilities.

Moreover, it is a further object of the invention to provide a coating composition which has improved DOI while still maintaining improved resistance to visual defects caused by surface contamination.

The prior art has failed to satisfy these requirements of the automotive finishing industry.

U.S. Pat. No. 5,256,191 discloses a correction fluid composition comprising an opacifying pigment dispersed in a solution of a film-forming polymeric material and from 10 to 40 weight percent of a volatile organosiloxane, based on the total weight of the correction fluid, wherein the organosiloxane and a solvent are present in a particularly defined volume ratio.

U.S. Pat. No. 4,476,278 discloses a dust-proof coating composition consisting of (A) 100 parts of an alkyd resin, (B) 5 to 200 parts by weight of methyltrimethoxysilane,(C) a curing catalyst, and (D) 50 to 5000 parts by weight of a solvent mixture consisting of (a) a volatile organosilicon compound which has a boiling point of 70° to 250° C. at atmospheric pressure and has a formula selected from the group consisting of $(R^1)_4Si$, $(R^2)_3SiO[(R^3)_2SiO]_m Si(R^2)_3R^4Si[OSi(R^5)_3]_3$ and $[(R^6)_2SiO]_n$ wherein $R^1$ to $R^6$ respectively represent the same or different alkyl groups, m represents 0 or a positive integer and n represents a positive integer of 3 or above, and (b) a hydrocarbon solvent substantially free of methanol, wherein the amount of (a) is 5 to 95 wt. % of the total amount of (a) and (b).

JP 59105057 discloses a dust-proofing coating composition consisting of (A) 100 parts by weight alkyd resin, (B) 5 to 500 parts by weight organic silicon compound and (C) 50 to 5000 parts by weight of mixed solvent. The organic silicon compound (B) consists of a mixture of at least 5 parts weight (a) organosilane or organosiloxane having on average at least two hydrolysable groups per molecule and 0 to 100 parts weight (b) polyorgano siloxane with blocked terminal silanol groups having a viscosity of at least 100,000 cSt at 25 degrees C.

However, none of the prior art have resolved the problems addressed by the instant invention.

SUMMARY OF THE INVENTION

The present invention achieves these and other objects by providing a coating composition comprising no more than 2.00% by weight nonvolatile of Si-containing compounds, based on the total nonvolatile weight of the coating composition, and from 0.25 to no more than 5.0% by weight of a volatile linear siloxane of the formula:

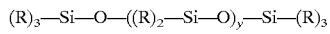

wherein R is H or an alkyl group of from 1 to 3 carbon atoms and y is a number from 0 to 6, based on the total nonvolatile weight of the coating composition.

The invention also provides a method of providing a cured coating composition having an improved distinctness of image as well as a method of coating a substrate. The method of providing a cured coating composition having an improved distinctness of image (DOI), requires the provision of a coating composition comprising no more than 2.00% by weight nonvolatile of Si-containing compounds, based on the total nonvolatile weight of the coating composition, providing from 0.25 to no more than 5.0 weight percent of a volatile linear siloxane of the formula

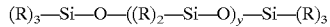

wherein R is H or an alkyl group of from 1 to 3 carbon atoms and y is a number from 0 to 6, based on the total nonvolatile weight of the coating composition, mixing together the coating composition and the volatile linear siloxane, applying the mixture of the coating composition and the volatile linear siloxane to a substrate to make a coated substrate, and curing the coated substrate to make a cured coated film having a DOI of at least 70. The method of coating a substrate involves providing a component (I) comprising a principal resin having no more than 2.00% by weight nonvolatile of Si-containing compounds, based on the total nonvolatile weight of the coating composition, providing a component (II) comprising at least one crosslinking agent comprising one or more groups reactive with the principal resin, providing from 0.25 to no more than 5.0 weight percent of a volatile linear siloxane of the formula

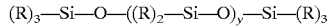

wherein R is H or an alkyl group of from 1 to 3 carbon atoms and y is a number from 0 to 6, based on the total nonvolatile weight of components (I) and (II), mixing together the volatile linear siloxane and one or more members selected from the group consisting of component (I), component (II), and mixtures thereof, using the mixture of the volatile linear siloxane and the one or more members to make a coating composition comprising component (I), component (II), and the volatile linear siloxane, and applying the coating composition to a substrate.

DETAILED DESCRIPTION OF THE INVENTION

The coating compositions of the invention generally have a film-forming component that forms a thermoplastic or thermosetting film via solvent evaporation or chemical crosslinking. Preferred are thermoset films produced by a crosslinking reaction between a principal resin having one or more functional groups and a crosslinking agent having one or more groups reactive with the functional groups of the principal resin.

Thermoplastic films formed by solvent evaporation are typically referred to as lacquers. Examples of resins used in suitable lacquers include but are not limited to nitrocellulose, cellulose acetate butyrate, acrylics, polyurethanes, and the like. Preferred are acrylics and polyurethanes.

Examples of functional groups of principal resins and/or crosslinking agents used in suitable crosslinkng coatings include, but are not limited to, active-hydrogen, isocyanate, epoxide, carboxylic acid, hydroxyl including methylol or methylalkoxy, carboxylic acid, amide, amine, acetoacetoxy, mercaptan, anhydride groups, mixtures thereof, and the like. A most preferred functional group for use in a principal resin is hydroxyl. A most preferred functional group for use in a crosslinking agent is isocyanate.

Resins suitable for use as the principal resin in the instant invention will generally have an average functionality of at least 1, preferably from 1.5 to 8, most preferably from 2 to 4. Examples of illustrative principal resins include acrylic, modified acrylic, polyester, polyurethane, polyepoxides, polycarbonates, polyamides, polyimides, hybrids thereof, mixtures thereof, and the like.

In one preferred embodiment of the invention, the principal resin is an acrylic polymer. Such polymers are well-known in the art, and can be prepared from monomers such as methyl acrylate, acrylic acid, methacrylic acid, methyl methacrylate, butyl methacrylate, cyclohexyl methacrylate, and the like. Nonfunctional monomers such acrylate esters and styrene can also be incorporated. Functional groups reactive with a crosslinking agent, i.e., hydroxyl, can be incorporated into the ester portion of the acrylic monomer. For example, hydroxy-functional acrylic monomers that can be used to form such polymers include hydroxyethyl acrylate, hydroxybutyl acrylate, hydroxybutyl methacrylate, hydroxypropyl acrylate, and the like. Aminofunctional acrylic monomers would include t-butylaminoethyl methacrylate and t-butylaminoethylacrylate. Other acrylic monomers having isocyanate-reactive functional groups in the ester portion of the monomer are also within the skill of the art.

In a particularly preferred embodiment, the film-forming component (I) will comprise a principal resin which is at least one acrylic polymer prepared from monomers selected from the group consisting of acrylic acid, methacrylic acid, acrylate alkyl esters, hydroxyfunctional acrylate esters, ethylenically unsaturated nonfunctional monomers and mixtures thereof. Such a polymer will generally have a number average molecular weight in the range of from 1000 to 50,000, a hydroxyl number of from 200 to 3000 mg KOH/g, and an acid number in the range of from 0.1 to 25 mg KOH/g.

Modified acrylics can also be used as the principal resin of the film-forming component of the invention. Such acrylics are typically polyester-modified acrylics or polyurethane-modified acrylics, as is well known in the art. An example of one preferred polyester-modified acrylic is an acrylic polymer modified with δ-caprolactone. Such a polyester-modified acrylic is described in U.S. Pat. No. 4,546,046 of Etzell et al, the disclosure of which is incorporated herein by reference. Polyurethane-modified acrylics are also well known in the art. They are described, for example, in U.S. Pat. No. 4,584,354, the disclosure of which is incorporated herein by reference.

Polyesters having hydroxyl groups, acid groups, or amino groups as isocyanate-reactive groups can also be used in the film-forming component of the invention. Such polyesters are well-known in the art, and may be prepared by the polyesterification of organic polycarboxylic acids (e.g., phthalic acid, hexahydrophthalic acid, adipic acid, maleic acid) or their anhydrides with organic polyols containing primary or secondary hydroxyl groups (e.g., ethylene glycol, butylene glycol, neopentyl glycol).

Other polymers suitable for use in the film-forming component include polyurethanes and polyureas. Polyurethanes having active hydrogen functional groups are also well-known in the art. They are prepared by a chain extension reaction of a polyisocyanate (e.g., hexamethylene diisocyanate, isophorone diisocyanate, MDI, etc.) and a polyol (e.g., 1,6-hexanediol, 1,4-butanediol, neopentyl glycol, trimethylol propane). Similarly, polyureas having active hydrogen functional groups are prepared by the reaction of an isocyanate functional compound, such as is discussed above for the preparation of polyurethanes, with amines such as primary and secondary amines. Both polyurethanes and polyureas can be provided with active hydrogen functional groups by capping the polymer chain with an excess of diol, polyamine, amino alcohol, or the like.

Although polymeric or oligomeric film-forming components are often preferred, lower molecular weight non-polymeric film-forming components may also be used in some applications, for example aliphatic polyols (e.g., 1,6-hexane diol), hydroxylamines (e.g., monobutanolamine), and the like.

The film-forming components of the invention may, and most preferably will, further comprise one or more crosslinking agents. Examples of suitable crosslinking agents include those compounds having one or more functional groups reactive with the functional groups of the film-forming polymer. Examples of suitable crosslinking agents include isocyanate functional compounds and aminoplast resins, epoxy functional compounds, acid functional compounds and the like. Most preferred crosslinkers for use in the coating compositions of the invention are epoxide resins, aminoplast resins and isocyanate functional compounds, with isocyanate functional compounds being most preferred.

Epoxy resins are typically those constructed through reaction of an oxirane functional group with a phenolic or carboxylic acid group. These resins are often a stoichiometric blend of ephichlorhydrin with phenolics such as bisphenol A or novalac resins, and derivatives thereof, or oxirane functional resins, such as acrylic resins prepared with glycidyl acrylate or methacrylate, and derivatives thereof.

Aminoplast resin refers to melamine or urea formaldehyde resins. Illustrative examples include but are not limited to monomeric or polymeric melamine resins, partially or fully alkylated melamine resins, methylol ureas such as urea formaldehyde and alkoxy ureas such as butylated urea formaldehyde.

In a most preferred embodiment, the film-forming component will comprise an isocyanate functional crosslinking agent.

Suitable isocyanate functional crosslinking agents include polyisocyanates that are aliphatic, including cycloaliphatic polyisocyanates, or aromatic. Useful aliphatic polyisocyanates include aliphatic diisocyanates such as ethylene diisocyanate, 1,2-diisocyanatopropane, 1,3-diisocyanatopropane, 1,6-diisocyanatohexane, 1,4-butylene diisocyanate, lysine diisocyanate, hexamethylene diisocyanate (HDI), 1,4-methylene bis-(cyclohexylisocyanate) and isophorone diisocyanate. Useful aromatic diisocyanates include the various isomers of toluene diisocyanate, meta-xylenediioscyanate and paraxylenediisocyanate, also 4-chloro-1,3-phenylene diisocyanate, 1,5-tetrahydro-naphthalene diisocyanate, 4,4'-dibenzyl diisocyanate and 1,2,4-benzene triisocyanate can be used. In addition, the various isomers of .alpha.,.alpha.,.alpha.',.alpha.'-tetramethyl xylene diisocyanate can be used. Aliphatic polyisocyanates are preferred, particularly hexamethylene diisocyanate and isophorone diisocyanate.

Also suitable for use are the biurets, aliphonates and/or isocyanurates of such aliphatic or aromatic polyisocyanates. Preferred for use as crosslinking agents in the film-forming components of the invention are the biurets and isocyanurate of polyisocyanates, especially of the aliphatic polyisocyanates such as hexamethylene diisocyanate and isophorone diisocyanate. Most preferred for use as crosslinking agents are the biurets and isocyanurates of hexamethylene diisocyanate.

The coating compositions of the invention will generally contain no more than 2.00% by weight of nonvolatile silicon containing compounds, based on the total nonvolatile weight of the coating composition, preferably from 0.00 to no more than 1.00 weight percent, and most preferably from 0.00 to less than 0.50 weight percent, based on the total nonvolatile weight of the coating composition.

It will be appreciated that Si- or silicon containing compounds may be present as additives in the coating composition or as components of the film forming compositions. The latter such silicon containing compounds may be referred to as "crosslinkable silicon containing compounds", which term refers to silicon containing compounds which enter into the film forming reaction. If silicon containing compounds are present in the coating compositions of the invention, it is preferred that they be present as additives that do not enter into the film forming reaction via a crosslinking reaction. In a most preferred embodiment, the film-forming component will be free of any crosslinkable silicon containing film-forming components.

The coating compositions of the invention will further comprise a volatile linear siloxane of the formula:

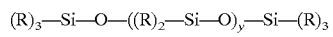

$(R)_3-Si-O-((R)_2-Si-O)_y-Si-(R)_3$ wherein R is H or an alkyl group of from 1 to 3 carbon atoms and y is a number from 0 to 6. Preferably, R is an alkyl group of from 1 to 3 carbons and is most preferably a methyl group. y is preferably a number from 0 to 3, more preferably from 0 to 2, and is most preferably 2. Examples of particularly preferred volatile linear siloxanes for use in the instant invention are hexamethyldisiloxane, octamethyltrisiloxane, decamethyltetrasiloxane, and dodecamethylpentasiloxane. Octamethyltrisiloxane and decamethyltetrasiloxane are preferred, with decamethyltetrasiloxane being most preferred.

The volatile linear siloxanes of the invention have been found to be useful in amounts of from 0.25 to no more than 5 weight percent, based on the total nonvolatile weight of the coating composition. Use of amounts greater than 5 weight percent have been found to produce negative appearance and/or performance effects in the finished film. Amounts of less than 0.25 weight percent do not provide sufficient improvements in cratering resistance or DOI.

Preferably, the volatile linear siloxanes of the invention will be used in amounts of less than 4.0 weight percent, based on the total nonvolatile weight of the film-forming component. More preferably, the volatile linear siloxanes of the invention will be used in an amount of from 0.25 to 3.0 weight percent, based on the total nonvolatile weight of the film-forming component. Particular improvements have been found when the volatile linear siloxanes are used in an amount of from 0.25 to 4.0 weight percent, and especially in an amount of from 0.50 to 3.0 weight percent, all based on the total weight nonvolatile of the film-forming component of the coating compositions of the invention.

It will be appreciated that a true solvent is a liquid which can dissolve the binder. A solvent is a thus a single liquid or blends of liquids, volatile under specified drying conditions, and in which the binder or film-forming component is completely soluble. European Standards, XP-002066658, Paints and Varnishes—Terms and definitions for coating materials—Part 1: General Terms, European Committee for Standardization. Alternatively, a solvent may be defined as a pure or mixed liquid that is used to make a coating flowable prior to its application. *Understanding Paint and Painting Processes*, $3^{rd}$ Edition, Schneberger, Dr. Gerald L., Hitchcock Publishing Co. Wheaton, Ill. 60188.

It will be appreciated that the volatile linear siloxanes used in the instant invention are generally not, and most preferably will not be, solvents for the film-forming component of the instant invention. The volatile linear siloxanes as used herein function as additives and not as solvents for the film-forming component.

The composition of the present invention may further comprise any additional ingredient, which imparts any desired characteristic to the composition, or to the process, or to the curable or cured coating composition made therefrom. Such additional ingredients comprise rheology control agents, leveling agents, catalysts, cure inhibiting agents, anti-yellowing agents, free radical scavengers, melamine, and anti-cratering agents. If the coating composition of the invention is a two-component composition, such additives may be present in component (I) or component (II).

A solvent may optionally be utilized in the coating composition used in the practice of the present invention. This solvent should act as a solvent with respect to all of the components in the composition.

The coating compositions of the invention are suitable for use as one or two-component coating compositions and may be used as a primer, basecoat, topcoat, clearcoat or mixture thereof such as composite coating.

Automotive coatings, both OEM and refinish should typically have minimum DOIs of at least 70, preferably at least 80, and most preferably 90 or higher. It is believed that the use of the instant invention results in improvements in DOI of at least 5 points, preferably 10 or more, relative to identical coating compositions lacking the use of the volatile linear siloxane in the amounts as indicated. DOI may be, and preferably will be measured per ASTM E-430, using an ATI DI/glossmeter, model 1792 or an equivalent method thereof.

The invention is further illustrated but is not limited by the following examples in which all parts and percentages are by weight unless otherwise specified.

EXAMPLES

Example I

A 12×18-inch pre-primed aluminum panel was wiped with a cloth saturated with WD-40® lubricant (WD-40 Company), representing a common substrate contaminant, and allowed to dry for approximately ten minutes. One half of the panel was carefully masked. An automotive refinish clear coating, DC-92 (BASF Corporation), was mixed in a 3:1:0.2 ratio, by volume, with DH-46 hardener (BASF Corporation) and UR-50 reducer (BASF Corporation), respectively, and applied in two coats to the exposed portion of the panel via air atomized spray to a dry film thickness of 2.1–2.3 mils. No fisheyes were observed, however the pattern of the wiped lubricant could be detected through the clear coating. This phenomenon is referred to as "telegraphing" the contaminant on the substrate by the coating.

The coated half of the panel was then carefully masked. To the DC-92 component was added 1% by weight of decamethyltetrasiloxane (2.06% based on non-volatile) and mixed in a 3:1:0.2 ratio, by volume, with DH-46 hardener and UR-50 reducer, respectively, and applied in two coats to the exposed portion of the panel via air atomized spray to a dry film thickness of 2.1–2.3 mils. No fisheyes or telegraphing was observed.

Example II

A 12×18-inch pre-primed aluminum panel was wiped with a cloth saturated with FreKote® TR-900 mold release agent (Dexter Corporation), representing a common substrate contaminant, and allowed to dry for approximately ten minutes. One half of the panel was carefully masked. An automotive refinish clear coating, DC-92 (BASF Corporation) was mixed in a 3:1:0.2 ratio, by volume, with DH-46 hardener (BASF Corporation) and UR-50 reducer (BASF Corporation), respectively, and applied in two coats to the exposed portion of the panel via air atomized spray to a dry film thickness of 2.1–2.3 mils. Numerous fisheyes were observed.

The coated half of the panel was then carefully masked. To the DC-92 component was added 1% by weight of decamethyltetrasiloxane (2.06% based on non-volatile) and mixed in a 3:1:0.2 ratio, by volume, with DH-46 hardener and UR-50 reducer, respectively, and applied in two coats to the exposed portion of the panel via air atomized spray to a dry film thickness of 2.1–2.3 mils. No fisheyes or telegraphing was observed.

What is claimed is:

1. A coating composition comprising
   a film-forming component comprising at least one principal resin selected from the group consisting of acrylic resins, urethane resins, epoxy functional resins, alkyd resins, polyester resins, and mixtures thereof, at least one crosslinking agent, and no more than 2.00% by weight nonvolatile Si-containing compounds, based on the total nonvolatile weight of the coating composition, and
   from 0.25 to no more than 5.0% by weight of a volatile linear siloxane of the formula:

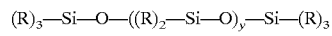

$(R)_3$—Si—O—$((R)_2$—Si—O$)_y$—Si—$(R)_3$ wherein R is H or an alkyl group of from 1 to 3 carbon atoms and y is a number from 0 to 6, based on the total nonvolatile weight of the coating composition and the volatile linear siloxane is not a solvent for the film-forming component.

2. The coating composition of claim 1 wherein the at least one principal resin is a hydroxyl functional acrylic resin.

3. The coating composition of claim 1 wherein the film-forming component is free of crosslinkable Si-containing compounds.

4. The coating composition of claim 1 comprising from 0.25 to less than 5.0 percent by weight of the volatile linear siloxane, based on the total nonvolatile weight of the coating composition.

5. The coating composition of claim 4 comprising from 0.25 to 4.0 percent by weight of the volatile linear siloxane, based on the total nonvolatile weight of the coating composition.

6. The coating composition of claim 5 comprising from 0.50 to 3.00 percent by weight of the volatile linear siloxane, based on the total nonvolatile weight of the coating composition.

7. The coating composition of claim 1 wherein y is a number from 0 to 3.

8. The coating composition of claim 1 wherein y is a number from 0 to 2.

9. The coating composition of claim 1 wherein y is 2.

* * * * *